(12) United States Patent
Paradis et al.

(10) Patent No.: US 7,350,752 B2
(45) Date of Patent: Apr. 1, 2008

(54) FAIRING AND INSTALLATION METHODOLOGY FOR SENSOR PRESSURE BELTS

(75) Inventors: Larry C. Paradis, Maple Valley, WA (US); Steven B. Brown, Dupont, WA (US); Matt R. Dickerson, Renton, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 11/078,984

(22) Filed: Mar. 11, 2005

(65) Prior Publication Data

US 2006/0202086 A1 Sep. 14, 2006

(51) Int. Cl.
*B64C 7/00* (2006.01)

(52) U.S. Cl. ..................................... 244/129.1; 73/714

(58) Field of Classification Search ................ 244/1 R, 244/129.1; 73/170.02, 714, 866.5
See application file for complete search history.

(56) References Cited

U.S. PATENT DOCUMENTS

| 3,596,269 | A  | * | 7/1971  | Laska ......................... 340/518 |
| 6,134,485 | A  | * | 10/2000 | Tanielian et al. ............. 701/14 |
| 6,443,390 | B2 | * | 9/2002  | Bourgon et al. ............ 244/1 R |
| 6,595,062 | B1 | * | 7/2003  | Luke et al. .................. 73/714 |
| 6,662,647 | B2 | * | 12/2003 | Schoess et al. .......... 73/170.02 |

* cited by examiner

*Primary Examiner*—Rob Swiatek
(74) *Attorney, Agent, or Firm*—Klein, O'Neill & Singh, LLP

(57) ABSTRACT

A fairing system developed to reduce the flow disturbance around sensor elements allowing accurate measurement of the pressure distribution on an airplane exterior surface. The fairing also protects the sensors and electronics of the pressure belt from direct exposure to airflow.

12 Claims, 4 Drawing Sheets

FAIRING AND INSTALLATION METHODOLOGY FOR SENSOR PRESSURE BELTS

BACKGROUND

1. Field of the Invention

This invention relates generally to a fairing system developed to reduce the flow disturbance around sensor elements allowing accurate measurement of the pressure distribution on an airplane exterior surface.

2. Related Art

The ability to measure the pressure distribution across an airplane external surface is a requirement for Flight Test. To measure pressure distribution tubing has been glued to the external surface and plumbed to pressure sensors positioned in a remote location. This solution has proved to be labor intensive, expensive to install and troublesome to maintain.

A sensor pressure belt has been developed which locates the sensor at the required measurement location. For example, in U.S. Pat. No. 6,134,485, a system and method for analyzing physical parameters of flight data is described, which includes a multi-sensor system having an array of belts. Each belt includes a plurality of interconnected belt segments including a substrate having an electrically conductive digital data bus, and at least one module having a first sensor, a second sensor and a digital signal processor, and a coating for protecting the belt segment. The first and second sensors, which are preferably formed as microelectromechanical sensors sharing a common substrate, respectively generate signals representative of a first physical parameter and a second physical parameter. The processor receives and analyzes the first and second signals to generate a third signal. The third signal is transmitted along the electrically-conductive bus to a remotely-located controller. The controller analyzes the third signal to obtain flight status information relating to the effect of the physical parameters on the flight. U.S. Pat. No. 6,134,485 is incorporated herein by reference. Unfortunately, the pressure belt is not suitable to be exposed directly to airflow.

Accordingly, what is needed is a mechanism to protect the sensors, create a smooth aerodynamic surface over the pressure belt and maintain the integrity of the installation in flight.

SUMMARY

This invention provides a fairing system developed to reduce the flow disturbance around sensor elements allowing accurate measurement of the pressure distribution on an airplane exterior surface. The fairing also protects the sensors and electronics of the pressure belt from direct exposure to airflow.

The fairing system includes a fairing assembly that can include shim stock and a thin rubber pad or substrate. The fairing assembly is configured to cover a sensor pressure belt, contour to the electronics on the belt and provide access at appropriate locations to allow for the measurement of pressure.

The fairing assembly is shaped such that when installed on the airplane surface it minimizes the flow disturbance across the pressure sensing element allowing an accurate measurement of the local pressure. The fairing assembly is attached to the airplane surface using conventional methods, such as tape for ease of installation.

In one aspect of the invention, a fairing system is provided which includes a multisensor system for measuring physical parameters at a plurality of discrete locations about a surface of an object; and a fairing assembly including an aerodynamically configured surface having a central access portion in which the multisensor system is disposed. The fairing assembly provides environmental access to the multisensor system to measure local pressure on the surface.

In yet another aspect of the invention, a method is provided for assembling a fairing system. The method includes positioning a pressure sensing element at a measurement location on an object surface; positioning a substrate over the pressure sensing element; bonding a CRES sheet to the substrate; and forming a pressure port hole to provide environmental access to the pressure sensing element; and positioning a fairing body over the pressure sensing element, the substrate and the CRES sheet.

The fairing system and installation method reduce installation flow time during an airplane test program. The fairing makes the airplane installation of the pressure belts efficient and thus reduces flight test costs.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION

Figure 1:
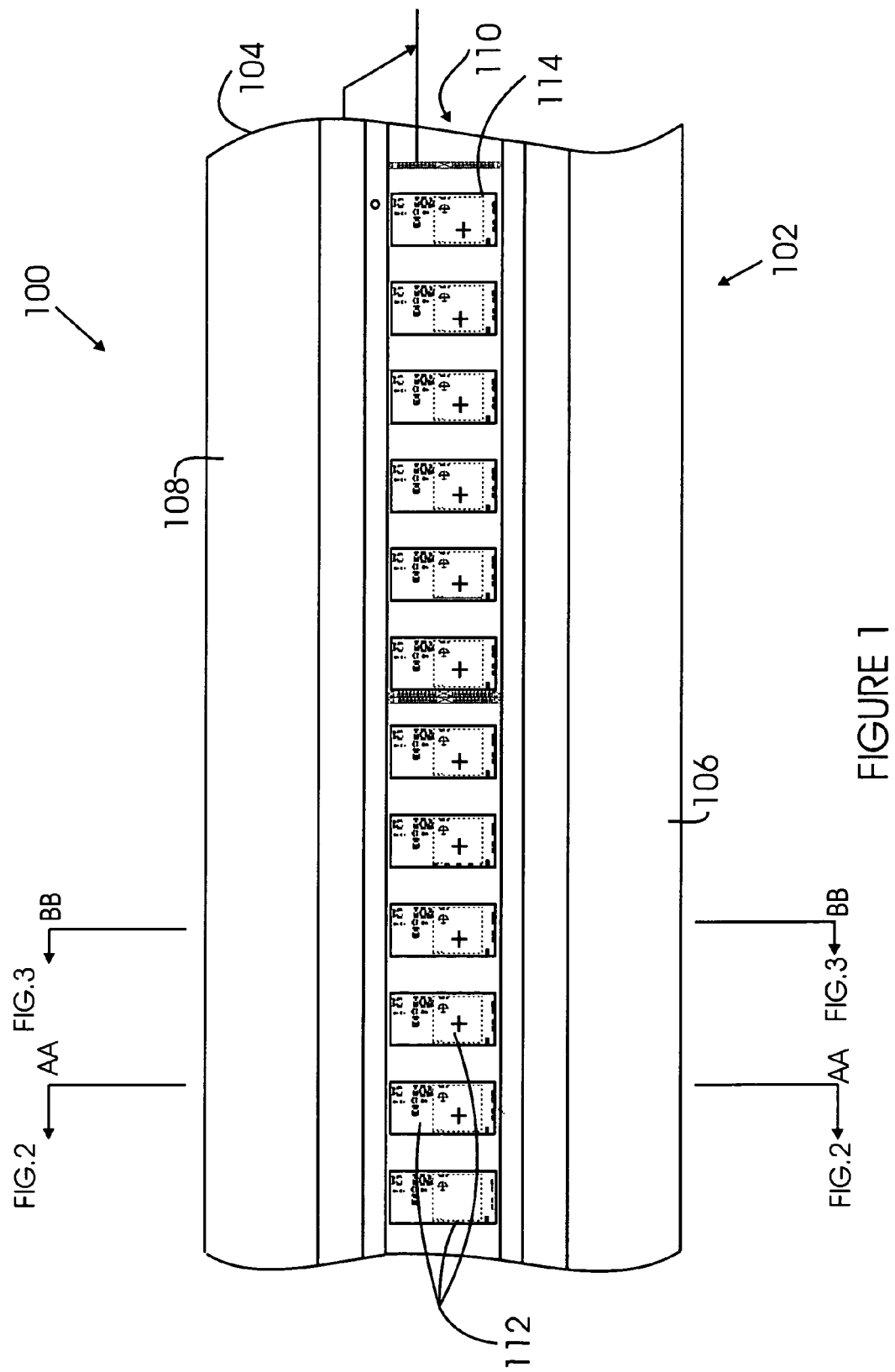
FIG. 1 is a simplified top view of the fairing system in accordance with an embodiment of the present invention.

FIG. 1 is a simplified view of fairing system 100 in accordance with an embodiment of the present invention. Fairing system 100 includes a fairing assembly 102 having an outer fairing body 104 defined by aero wedges 106 and 108 formed about a central access portion 110. Fairing assembly 102 also includes a substrate 206 and CRES (corrosion resistant steel) sheet 208. Generally, disposed within central access portion 110 is at least one pressure sensing element 112 for analyzing physical parameters of flight data. In one embodiment, pressure sensing element 112 is coupled to belt segment 114, which locates at least one pressure sensing element 112 at the required measurement location.

Fairing assembly 102 is configured to cover pressure sensing element 112 and belt segment 114 by being made to contour to the electronics on belt segment 114. Fairing assembly 102 provides access at appropriate locations to allow for the measurement of pressure.

Fairing body 104 is shaped such that when installed on an airplane surface it minimizes the flow disturbance across pressure sensing element 112 allowing an accurate measurement of the local pressure. Fairing body 104 can be made of any suitable material, for example, stainless steel shim stock.

Figure 2:
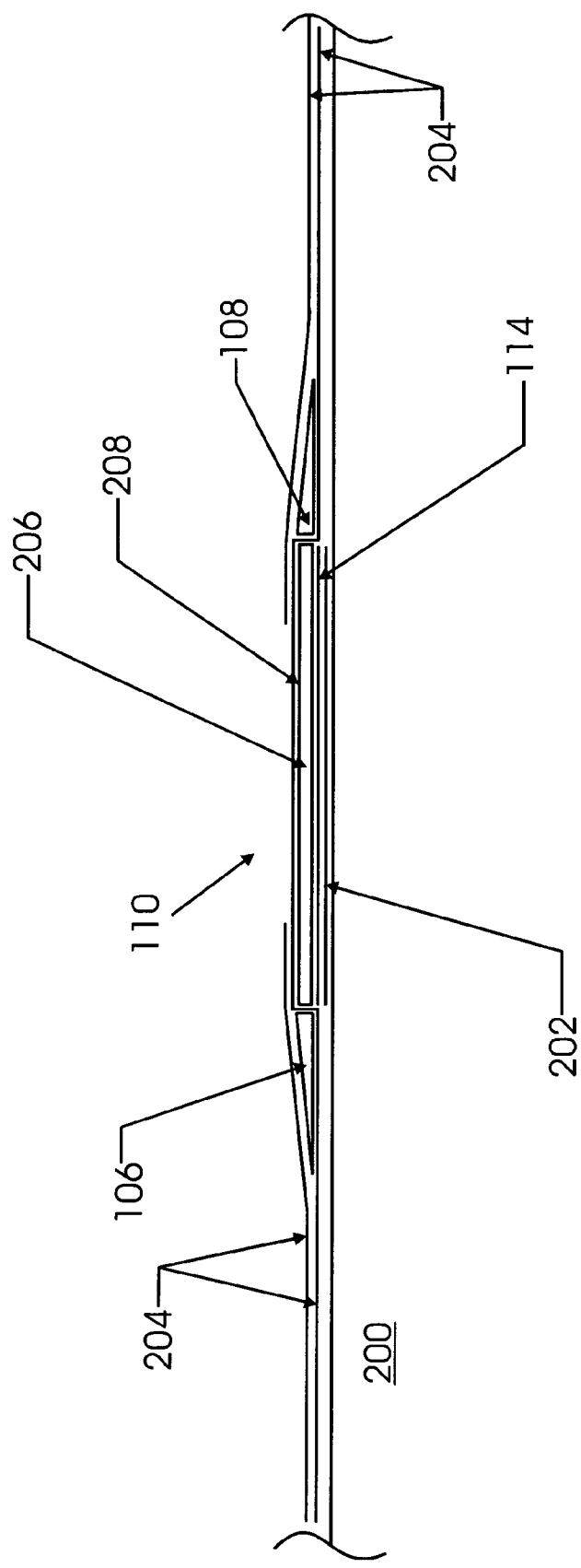
FIG. 2 is a simplified sectional view of the fairing system of FIG. 1 in accordance with an embodiment of the present invention.

FIG. 2 provides a sectional view of fairing assembly 102 cut across belt segment 114 in accordance with an embodiment of the present invention. As shown in FIG. 2, belt element 114 is coupled to airplane surface 200 using, for example, tape and the like, such as 3M #92 tape.

Fairing assembly 102 can be coupled to airplane surface 200 and made to surround belt segment 114 with aero wedges 106 and 108. In this embodiment, belt segment 114 is disposed within central portion 110 of fairing assembly 102 between aero wedges 106 and 108. Fairing assembly is mounted to airplane surface 200 using conventional methods, such as tape 204 and the like, for example, 3M Y434 aluminum tape, for ease of installation.

When properly positioned, a substrate 206 is positioned over belt segment 114. Substrate 206 can be made of any suitable thickness and material. In one embodiment, substrate 206 can be made of neoprene rubber to a thickness of about 3/32". In one embodiment, CRES sheet 208 is bonded to substrate 206. In this embodiment, CRES sheet 208 has a thickness of about 0.005".

Figure 3:
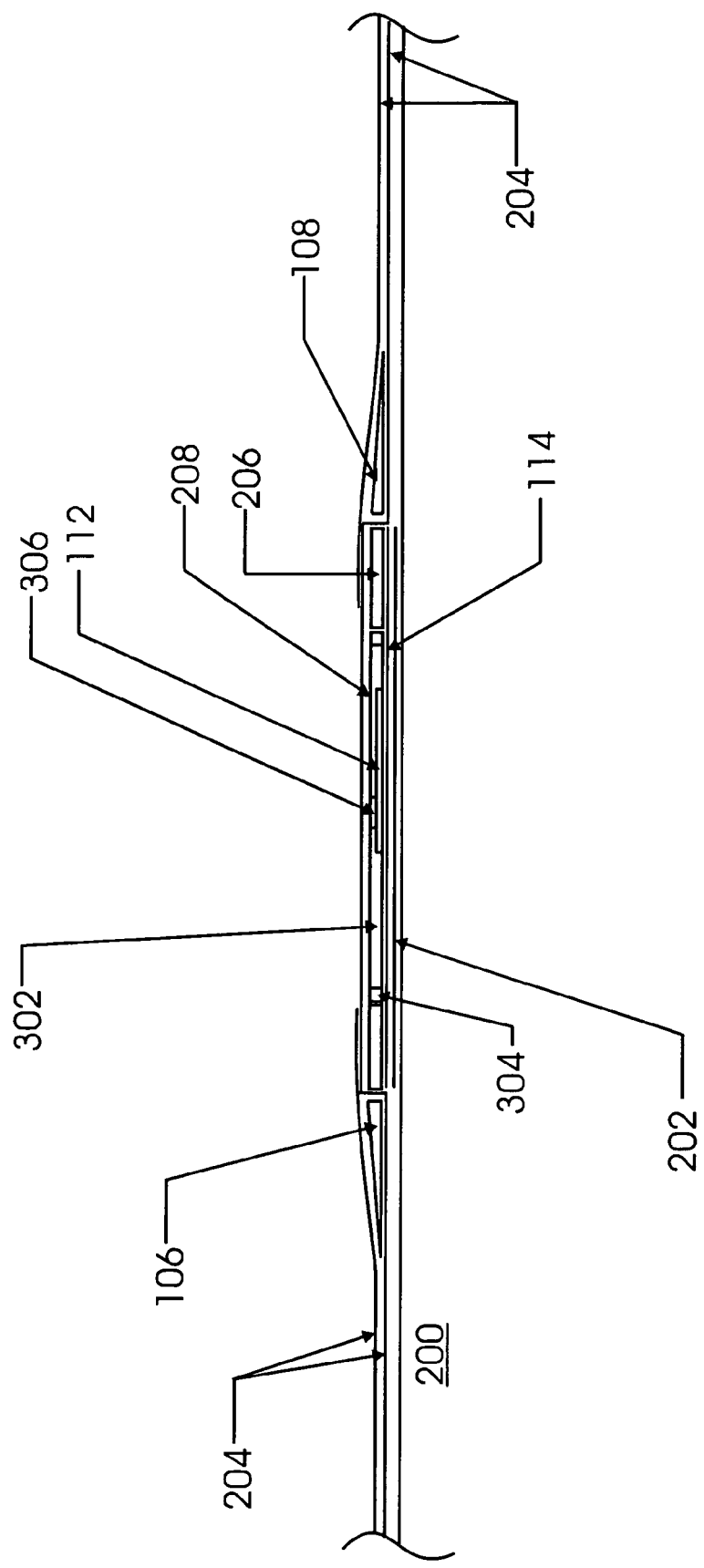
FIG. 3 is a simplified sectional view of the fairing system of FIG. 1 in accordance with an embodiment of the present invention.

FIG. 3 provides a sectional view of fairing assembly 102 cut across belt segment 114 and pressure sensing element 112 in accordance with an embodiment of the present invention. In contrast to FIG. 2, FIG. 3 shows a cavity 302 formed by removal of a portion of substrate 206 under CRES sheet 208. Cavity 302 provides space for pressure sensing element 112 and other discrete components formed on belt segment 114 while covered by fairing assembly 102. Sealant 304 is provided to seal cavity 302.

In one embodiment, at a prescribed location generally positioned above pressure sensing element 112 is formed a pressure port hole 306. Pressure port hole 306 allows for the measurement of local pressure by pressure sensing element 112 without the disturbance caused by turbulent airflow. Pressure port hole 306 can be of any suitable diameter, for example, 0.063" diameter.

It should be understood, as shown in FIG. 1, that belt element 114 can include a plurality of pressure sensing elements 112. Accordingly, fairing assembly 102 includes a plurality of port holes 306 formed on CRES sheet 308 above each pressure sensing element 112.

Figure 4:
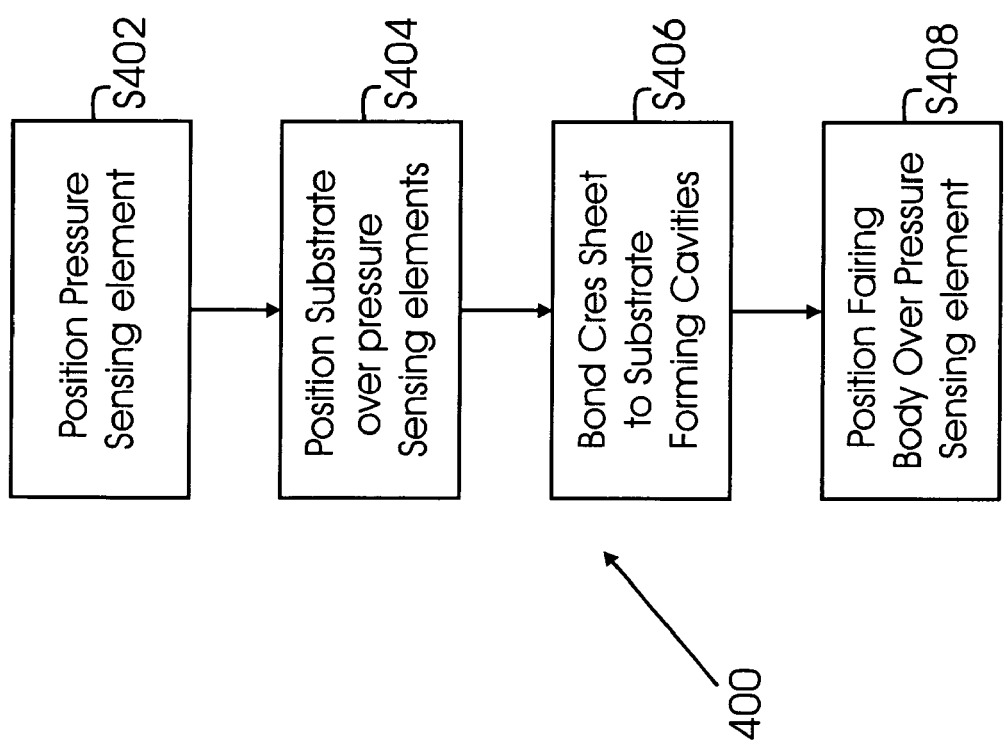
FIG. 4 is a flowchart describing an assembly method of forming the fairing system on the surface of an object in accordance with an embodiment of the present invention.

FIG. 4 is a flowchart describing an assembly method 400 of forming fairing system 100 on the surface of an object.

In step s402, a pressure sensing element is positioned at a measurement location on an object. In one embodiment, a plurality of pressure sensing elements 112 disposed on belt element 114 are secured by tape to the surface of an aircraft.

In step s404, substrate 206 is positioned over belt segment 114 and pressure sensing element 112. Substrate 206 includes a hole which allows substrate 206 to be placed over belt element 114 and allow pressure sensing element 112 to emerge through substrate 206.

In step s406, CRES sheet 208 is bonded to substrate 206. When bonded to substrate 206, the area over the hole forms cavity 302 in which pressure sensing element 112 resides. In one embodiment, a sealant 304 can be used to seal cavity 302.

A pressure port hole 306 is formed in CRES sheet 208 to provide access to otherwise sealed cavity 302 to allow for the measurement of local pressure.

In step s408, fairing body 104 including aero wedges 106 and 108 is positioned over belt element 114, pressure sensing element 112, and substrate 206, such that belt element 114 resides in central portion 110 of fairing assembly 102. Firing body 104 is secured to airplane surface 200 using tape 204 for ease of installation.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A fairing system comprising:
    a plurality of pressure sensing elements configured to measure pressure at a plurality of discrete locations about a surface of an object;
    a belt segment configured to locate the pressure sensing elements at the discrete locations;
    a substrate overlying the belt segment, the substrate including a plurality of cavities, at least some of the cavities containing the pressure sensing elements;
    a corrosion resistant steel (CRES) sheet overlying the substrate, the CRES sheet including a plurality of port holes, each port hole being located over one of pressure sensing elements; and
    a fairing assembly including first and second aero wedges disposed to either side of a central access portion in which the pressure sensing elements are disposed, the fairing assembly providing environmental access to the pressure sensing elements.

2. The fairing system of claim 1, herein said surface of an object comprises the surface of an aircraft body.

3. The fairing system of claim 1, wherein the fairing assembly is contoured to electronics on the belt segment.

4. The fairing system of claim 1, wherein the fairing assembly creates limited flow disturbance across the pressure sensing elements to allow accurate measurements of local pressures.

5. The fairing system of claim 1, wherein the substrate is constructed of neoprene rubber.

6. The fairing system of claim 5, wherein the substrate has a thickness of about 0.09375 inches.

7. The fairing system of claim 1, wherein the CRES sheet has a thickness of about 0.005 inches.

8. A fairing assembly configured for use with a multisensor pressure measurement system having at least one pressure module, the fairing assembly comprising:
    an aerodynamically shaped fairing body including first and second aero wedges disposed to either side of a central access portion in which said at least one pressure module is disposed;
    a substrate defining at least one hole configured to allow said at least one pressure module to emerge therethrough; and
    a corrosion resistant steel (CRES) sheet overlying said substrate, the CRES sheet having a pressure port to allow local pressure measurements by said at least one pressure module.

9. The fairing assembly of claim 8, therein the fairing assembly creates limited flow disturbance across the pressure sensing elements to allow accurate measurements of local pressures.

10. The fairing system of claim 8, wherein the substrate is constructed of neoprene rubber.

11. The fairing system of claim 10, wherein the substrate has a thickness of about 0.09375 inches.

12. The fairing system of claim 8, wherein the CRES sheet has a thickness of about 0.005 inches.

* * * * *